United States Patent [19]

Haylock et al.

[11] Patent Number: 4,731,404

[45] Date of Patent: Mar. 15, 1988

[54] POLYESTER COMPOSITION CONTAINING ESTER OF POLYFUNCTIONAL HIGH MOLECULAR WEIGHT ALCOHOL

[75] Inventors: John C. Haylock, Dennysville, Me.; Harold W. Tuller, Long Valley, N.J.; John A. Bander, Richmond, Va.

[73] Assignee: Allied Corporation, Morris Township, Morris County, N.J.

[21] Appl. No.: 899,701

[22] Filed: Aug. 25, 1986

[51] Int. Cl.$^4$ .............................. C08L 67/02
[52] U.S. Cl. .................... 524/310; 524/290; 524/291; 524/308; 524/317; 524/394; 524/397; 525/176; 525/438; 525/444
[58] Field of Search ............... 524/308, 310, 317, 290, 524/291; 525/444

[56] References Cited

U.S. PATENT DOCUMENTS

| | | | |
|---|---|---|---|
| 3,435,093 | 3/1969 | Cope | 260/857 |
| 3,516,957 | 6/1970 | Gray et al. | 260/22 |
| 3,639,527 | 2/1972 | Brinkmann et al. | 260/873 |
| 4,223,125 | 9/1980 | Bier et al. | 528/305 |
| 4,352,904 | 10/1982 | Deyrup | 524/292 |
| 4,357,268 | 11/1982 | Vanderkooi, Jr. et al. | 524/285 |
| 4,412,040 | 10/1983 | Albee, Jr. et al. | 525/143 |
| 4,429,067 | 1/1984 | Barenberg | 524/299 |
| 4,435,546 | 3/1984 | Bier et al. | 525/418 |
| 4,486,564 | 12/1984 | Deyrup | 524/308 |
| 4,548,978 | 10/1985 | Garrison, Jr. | 524/314 |
| 4,558,085 | 12/1985 | Lee | 524/299 |
| 4,558,096 | 12/1985 | Boon et al. | 525/166 |
| 4,562,216 | 12/1985 | Kishida et al. | 523/433 |

FOREIGN PATENT DOCUMENTS 1315699 10/1970 United Kingdom .

Primary Examiner—Patricia A. Short
Attorney, Agent, or Firm—Richard A. Negin

[57] ABSTRACT

The present invention is a composition comprising a linear saturated polyester and from 0.5 to 30 percent by weight of the polyester of at least one ester of a polyfunctional alcohol having a molecular weight of from 900 to about 1,500. The ester is of an alcohol and a carboxylic acid wherein the alcohol has the formula

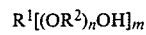

$$R^1[(OR^2)_nOH]_m$$

wherein $R^1$ is a hydrocarbon radical of from 3 to 10 carbon atoms, $R^2$ is a hydrocarbon radical of from 2 to 4 carbon atoms, n can be the same or a different interger of from 2 to 15, m is an integer of from 3 to 6. The alcohol has greater than 20 carbon atoms. The acid is a carboxylic acid of from 1 to 25 and preferably 3 to 10 carbon atoms, and from 1 to 10 carboxyl groups. Preferably the acid has from 3 to 10 carbon atoms and one carboxyl group.

18 Claims, No Drawings

POLYESTER COMPOSITION CONTAINING ESTER OF POLYFUNCTIONAL HIGH MOLECULAR WEIGHT ALCOHOL

BACKGROUND OF THE INVENTION

This invention relates to linear saturated polyester compositions. More particularly, the invention is directed to a linear saturated polyester composition containing at least one ester of a high molecular weight polyfunctional alcohol.

Molding formulations based on linear saturated polyesters, such as polyethylene terephthalate, should result in a molded product having good physical properties including flexural strength, modulus, tensile strength, and impact properties. The molding compound should have good molding properties, including a melt flow index for sufficient flow into the mold, good mold release properties and good surface finish appearance. The molded article should be crystalline and warp resistant.

It is desirable that satisfactory properties be attained using water heated molds. That is, molds heated to temperatures between 76.7° C. (170° F.) to about 110° C. (230° F.). In order to accomplish this, it is desirable for crystallization to begin at as high a temperature as possible upon the cooling of the molten polyester which was fed into the mold, and continue during the cooling to as low a temperature as possible. $T_{cc}$ is a measurement to determine at what temperature crystals first appear upon cooling from the melt. $T_{ch}$ is a measurement which indicates the temperature at which crystallization is no longer occurring upon cooling. It has been found that mold appearance and mold release properties can be related to $T_{ch}$. $T_{ch}$ is determined by measuring the temperature at which crystals appear upon heating an amorphous piece of polyester. $T_{cc}$ and and $T_{ch}$ can be measured using a Differential Scanning Calorimeter.

A variety of additives are disclosed in the art for use with linear saturated polyester compositions. Two important classes of additives include nucleators and plasticizers. Plasticizers include a variety of esters such as those disclosed in U.S. Pat. Nos. 4,223,125 and 4,435,546. These patents describe the use of esters of alcohols having up to 20 carbon atoms and preferably having a carbon bond to ester bond ratio of between 4 and 15, inclusive of the carbonyl atom.

It is known to use nucleating agents in crystallizable polymers, such as linear saturated polyesters of aromatic dicarboxylic acids. U.S. Pat. Nos. 3,435,093; 3,516,957; and 3,639,527 disclose various approaches to molding thermoplastic compositions of linear saturated polyesters of aromatic dicarboxylic acids, and are particularly applicable to polyethylene terephthalate. These patents generally disclose the use of salts of hydrocarbon and polymeric carboxylic acids as nucleating agents for linear saturated polyesters. Great Britain Patent No. 1,315,699 discloses the use of low molecular weight sodium, lithium or barium salts of mono- or polycarboxylic acids used with solid, inert inorganic substances.

The use of organic esters in combination with nucleators is disclosed in U.S. Pat. Nos. 3,516,957; 4,352,904; 4,486,564; 4,429,067; and 4,548,978. These patents disclose the use of a variety of plasticizers including specific ester compounds used in combination with other materials.

SUMMARY OF THE INVENTION

The present invention is a composition comprising a linear saturated polyester and from 0.5 to 30 percent by weight of the polyester of at least one ester of a polyfunctional alcohol having a molecular weight of from 900 to about 1,500. The ester is of an alcohol and a carboxylic acid wherein the alcohol has the formula

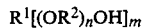

$$R^1[(OR^2)_nOH]_m$$

wherein $R^1$ is a hydrocarbon radical of from 3 to 10 carbon atoms, $R^2$ is a hydrocarbon radical of from 2 to 4 carbon atoms, n can be the same or a different integer of from 2 to 15, m is an integer of from 3 to 6. The alcohol has greater than 20 carbon atoms.

The acid is a carboxylic acid of from 1 to 25 and preferably 3 to 10 carbon atoms, and from 1 to 10 carboxyl groups. Preferably the acid has from 3 to 10 carbon atoms and one carboxyl group.

The composition of the present invention preferably contains a nucleating agent and optionally filler or reinforcing material, an impact modifier, an epoxy compound, and other conventional additives such as antioxidants, colorants, and the like.

Objects, features, and advantages of the present invention will become apparent by reference to the following specification:

DESCRIPTION OF THE PREFERRED EMBODIMENTS

The present invention is a composition comprising a linear saturated polyester, and from 0.5 to 30 percent by weight of the polyester of at least one ester of an alcohol and a carboxylic acid, wherein the alcohol has the formula

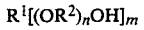

$$R^1[(OR^2)_nOH]_m$$

wherein $R^1$ is a hydrogen radical of from 3 to 10 carbon atoms, $R^2$ is a hydrocarbon radical of from 2 to 4 carbon atoms, n can be the same or a different integer of from 2 to 15, m is an integer of from 3 to 6. The alcohol has greater than 20 carbon atoms. The alcohol is esterified with an acid which is a carboxylic acid of from 1 to 25 carbon atoms, preferably 3 to 10 carbon atoms. The acid preferably has from 1 to 3 carboxyl groups and more preferably 1 to 2 carboxyl groups with one carboxyl group most preferred. The ester formed has a molecular weight of from 900 to about 1,500, and preferably 900 to 1,300.

The composition can optionally contain other additives such as nucleating agents, filler or reinforcing materials, impact modifiers, epoxies, antioxidants, colorants, and the like.

The composition of the present invention includes linear, saturated polyesters of aromatic dicarboxylic acids. The preferred linear saturated polyesters include polyethylene terephthalate, polybutylene terephthalate, and poly(1,4-cyclohexane dimethylene terephthalate), and mixtures thereof. Polyethylene terephthalate is the most preferred. The polyethylene terephthalate for use with the present invention has an intrinsic viscosity range between about 0.3 and about 1.20, with a preferred intrinsic viscosity range between about 0.4 and 0.7. Intrinsic viscosity is obtained by extrapolation of viscosity values to zero concentration of solutions of poly(ethylene terephthalate) in a 60 to 40 weight- /volume ratio of phenol and tetrachloroethane. The measurements are normalized to 25° C. The preferred polyethylene terephthalate melts between about 250° C. and 275° C. The polyethylene terephthalate can contain minor amounts, up to 10%, of other comonomers such as 1,4-cyclohexyldimethyldiol, butylenediol, neopentyldiol, diethylene glycol, or glutaric acid.

The polyester composition of the present invention contains from 0.5 to 30 percent, preferably from 1 to 10 and most preferably 2 to 8 percent of an ester of a polyfunctional alcohol and a carboxylic acid having a molecular weight of from 900 to 1,500 and preferably 900 to 1,300. The polyfunctional alcohol preferably has greater than 20 carbon atoms and has the formula

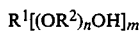

wherein $R^1$ is a hydrocarbon radical of from 3 to 10 carbon atoms, $R^2$ is a hydrocarbon radical of from 2 to 4 carbon atoms, n can be the same or different integer of from 2 to 15, m is an integer of from 3 to 6.

Preferably the alcohol is a trifunctional alcohol having the formula

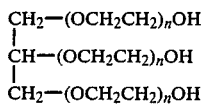

wherein n is from 3 to 15. The preferred alcohol has the formula set forth above, wherein n is 4 or 8.

The carboxylic acid has from 1 to 25 and preferably from 3 to 10 carbon atoms, and preferably from 1 to 3 and most preferably one carboxyl group. The most preferred carboxylic acid is an aliphatic carboxylic acid with from 3 to 10 carbon atoms and 1 carboxyl group. Useful acids include, but are not limited to, acetic acid, butyric acid, caproic acid, caprylic acid, pelargonic acid, 2-ethylhexanoic acid, lauric acid, myristic acid, palmitic acid, stearic acid, oleic acid, ricinolic acid, 2-ethyl butyric acid, tall oil acids, fatty acids, and the like. The most preferred acid is 2-ethylhexanoic acid. Di- and tri-carboxylic acids which are useful include adipic acid, azelyic acid, citric acid, fumaric acid, maleic acid, glutaric acid, succinic acid, tartaric acid, and sebacic acid. The above list of acids is illustrative rather than limiting.

Two preferred esters of the present composition are:

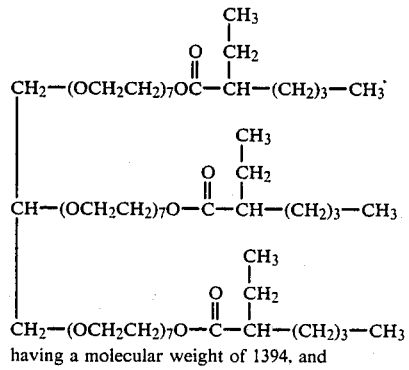

having a molecular weight of 1394, and

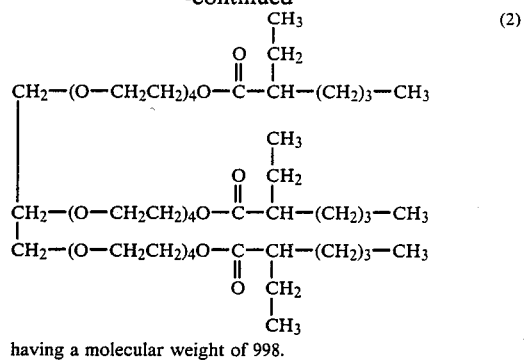

having a molecular weight of 998.

It has been found that the esters of the present invention act as plasticizers in that they lower the $T_{ch}$ thereby allowing crystallization to take place as the polyester composition cools to lower temperatures. The plasticizing effect has been found to improve mold release properties and molded appearance of molded polyester, preferably polyethylene terephthalate articles. $T_{ch}$ is the temperature at which crystal formation occurs upon heating an amorphous piece of polyester. $T_{ch}$ is measured as the maximum of the peak of the curve formed when the amorphous polyester is heated in a Differential Scanning Colorimeter (DSC). Typically the polymer is heated at 10° C./minute. The use of a plasticizer reduces the $T_{ch}$. The $T_{ch}$ for pure polyethylene terephthalate (0.5 intrinsic viscosity) is approximately 125° C.–130° C. It is desirable to lower this value as much as possible for the best mold release and molded article release properties. The $T_{ch}$ is preferably not greater than about 110° C.

The use of the trifunctional relatively high molecular weight esters of the present invention as plasticizers has been found to improve plasticization as indicated by the low $T_{ch}$. Additionally, the use of high molecular weight trifunctional esters of the present invention has been found to provide advantages including low volatility, attributed to its relatively high molecular weight and at the same results in excellent molded surface appearance.

The present invention can optionally contain nucleating agents in combination with the polyester and plasticizer. The preferred nucleating agent is at least one compound containing a sodium cation or a potassium cation. The nucleating agent is preferably the sodium salt of a carboxylic acid, which is most preferably a hydrocarbon carboxylic acid. Useful nucleating agents include the sodium or potassium salts of hydrocarbon acids containing from 3 to at least 54 carbon atoms and from 1 to 3 carboxyl groups. The hydrocarbon acids can be aromatic or aliphatic acids. Other preferred nucleating agents include the sodium salts of a carboxyl containing organic polymer. Such a polymer can contain one or more sodium neutralized carboxyl group. Preferred polymeric sodium salts include copolymer acids which are the copolymers of an α-olefin and an α,β-ethylenically unsaturated carboxylic acid. The copolymer can contain additional materials including esters and other substituents on the reactive groups. The α-olefin is preferably ethylene. The α,β-ethyleneically unsaturated carboxylic acid can be a monocarboxylic acid, or have more than one carboxylic group. The α,β-ethylenically unsaturated carboxylic acid which can be copolymerized with the α-alpha olefin preferably has 3 to 8 carbon atoms. Examples of such acids include acrylic acid, methacrylic acid, ethacrylic acid, itaconic acid, maleic acid, fumaric acid, and monoesters of other dicarboxylic acids, such as methyl hydrogen maleate, methyl hydrogen fumarate, ethyl hydrogen fumarate, and maleic anhydride which is considered to behave like an acid and be an acid in the present invention.

The α-olefin is preferably an ethylene. The concentration of ethylene in the copolymer is at least 50 mol percent and preferably from 80 to 95 percent by weight. Useful copolymer salts include those disclosed in U.S. Pat. Nos. 4,412,040 and 3,435,093, both hereby incorporated by reference.

Another preferred nucleator for use in combination with the present invention are nucleating agents which are of the type described in U.S. Pat. No. 4,357,268 hereby incorporated by reference. These include sodium or potassium salts of dimer acids, trimer acids, or mixtures of the two. The dimer acid has at least 36 carbon atoms and 2 carboxyl groups and the trimer acid has at least 54 carbon atoms and 3 carboxyl groups. The definition of dimer acid is a high molecular weight dibasic acid, which is liquid (viscous), stable, resistant to high temperatures. It is produced by the dimerization of unsaturated fatty acids, as mid-molecule and usually contains 36 carbon atoms. Trimer acids, which usually contain 3 carboxyl groups and 54 carbon atoms are similarly prepared.

The temperature at which crystal formation occurs is indicated by $T_{cc}$. The $T_{cc}$ is measured using a Differential Scanning Calorimeter which measures the heat evolved versus temperature. Between 5 and 10 milligrams of sample is prepared. The sample can be made in the form of a compression molded film which is vacuum dried or as a pellet which is hammered flat. The sample is placed in the Differential Scanning Calorimeter and heated to 280° C. where it is held for two minutes. The sample is cooled at 10° C. per minute. The $T_{cc}$ is the temperature at which the crystallization takes place and is measured as the peak in the DSC curve. The $T_{cc}$ is approximately 195° C. to 200° C. for polyethylene terephthalate having an intrinsic viscosity normalized to about 0.50. It is desirable for crystallization from the melt to begin at as high a temperature as possible without adversely affecting other properties. This allows crystal nucleation to begin earlier and for crystallization to take place over a greater temperature range. The $T_{cc}$ is preferably at least 205° C., and more preferably at least 210° C. The $T_{cc}$ has been increased to as high at 219° C. using the reaction product of the present invention in a PET composition normalized to 0.5 intrinsic viscosity.

The preferred polyethylene terephthalate composition should have as high a $T_{cc}$ as possible and as low a $T_{ch}$ as possible, allowing crystal formation and growth over the widest possible temperature range. The $T_{ch}$ is preferably not greater than about 110° C. Therefore, the temperature range over which crystallization can occur is from about 220° C. to about at least as low as 110° C. during cooling of the composition of the present invention. The range for pure polyethylene terephthalate is about 195° C. to 125° C.

Any suitable filler and/or reinforcing agent can be used. The fillers may optionally be treated with various coupling agents or adhesion promotors as is known to those skilled in the art. Such fillers may be selected from a wide variety of minerals, metals, metal oxides, siliceous materials, metal salts, and materials thereof. Examples of fillers include glass fibers, alumina, feldspar, asbestos, talc, calcium carbonates, clay, carbon black, quartz, novaculite and other forms of silica, kaolinite, bentonite, garnet, mica, saponite, etc. The foregoing recited fillers are illustrative only and are not meant to limit the scope of the fillers that can be utilized in this invention. As noted above, the most preferred filler is glass fibers. There is up to 150 percent by weight of the polyethylene terephthalate of filler, and preferably 30 percent to 90 percent by weight of the polyethylene terephthalate of filler, preferably fiberglass.

The composition of the present invention can optionally contain additional plasticizers. A nonlimiting group of plasticizers is disclosed in the patents cited in the background of the present invention and hereby incorporated by reference.

The composition preferably includes impact modifiers known for use in polyester compositions. Preferred input modifiers are ethylene copolymers and terpolymers having carboxylic acids or derivatives. Preferably copolymers of ethylene and carboxylic acids, their esters or salts can be used as impact modifiers. Included among those impact modifiers are the following copolymers: ethylene-acrylic acid, ethylene-methacrylic acid, ethylene-ethyl acrylate, ethylene-vinyl acetate, and mixtures thereof. Useful impact modifiers include copolymers of alfa-olefins and the metal salts of carboxylic acids and particularly the sodium and potassium salts. These compolymer salts both nucleate and improve impact resistance. There can be used up to about 30 percent, and preferably from about 2 percent to about 10 percent of the impact modifier, based on the weight of the poly(ethylene terephthalate).

The composition can contain up to about 5 percent based on the weight of the polyethylene terephthalate, of a polyepoxide. The epoxy resin which can be used includes an epoxy formed from bisphenol-A and glycidyl ether. Useful polyepoxides are epoxy cresol novolac resins of the type produced by Ciba-Geigy Corporation, and include ECN ™ 1234, 1273 and 1229. A preferred polyepoxide is an epoxy formed from bisphenol-A and glycidyl ether. Preferably, there is from 0.5 percent to 4.0 percent, based on the weight of the polyethylene terephthalate, of polyepoxide. The polyepoxides act as chain extenders and help compensate for polyethylene terephthalate chains broken by hydrolysis.

Optionally, other nucleating agents known in the art, such as inert nucleating agents can be used. Talc is an example of the preferred inert nucleating agent.

A preferred filled composition comprises polyethylene terephthalate, from 60% to 120% glass fibers and 2% to 8% of the ester of the present invention from, 1.0 to about 3 percent of a polyepoxide and from about 0.1 to about 5 percent of a sodium carboxylate salt as described above. The percents are based on the weight of the polyethylene terphthalate.

As indicated in the examples to follow, the use of the ester of the present invention results in the polylinear saturated polyester, polyethylene terephthalate, molding composition which can be injection molded into water heated molds as temperatures as low as 76.7° C. (170° F.). As the mold temperature increases, there is an improvement in molded article appearance. The ester of the present invention, the carboxylate salt and polyethylene terephthalate are melt blended. In the most preferred embodiment, they can be melt blended in an extruder at a temperature above the melt temperature of the polyester. In a preferred embodiment, the components are melt blended at a temperature between 200° C. (480° F.) and 316° C. (600° F.) in an extruder.

The polyethylene terephthalate composition of the present invention can be formed by blending the components together by any convenient means to obtain an intimate blend. Neither temperature nor pressure are critical. For example, the polyethylene terephthalate can be mixed dry in a suitable blender or tumbler with the other components and the mixture melt extruded. The exudate can be chopped. If desired, a reinforcing or filling agent can be omitted initially and added after the first melt, and the resulting mixture can be melt extruded.

The composition of the present invention is particularly useful to make injection molded articles.

The examples and compositions set forth below illustrate the nature of the invention and the manner of carrying it out. However, the invention should not be considered as being limited to the details thereof. All parts are pecent by weight unless otherwise indicated.

EXAMPLES 1-12

All of the following examples were made using polyethylene terephthalate having an intrinsic viscosity (IV) in the range of 0.66 to 0.72. Intrinsic viscosity is measured by extrapolation of the viscosity values to zero concentration of solutions of polyethylene terephthalate in a 60 to 40 volume ratio of phenol and tetrachloroethane. The measurements are normalized 25° C.

The fiberglass used was ⅛ inch long short glass fibers made by Pittsburgh Plate Glass as PPG 3540. The epoxy compound used in the compositions was diglycidyl ether of Bisphenol A and sold by Ciba-Geigy as Araldite 7074. The ethylene acrylic acid (EAA) copolymer used was manufactured by Dow Chemical Corporation as Dow EAA445 which is described as having 8 percent by weight acrylic acid and a melt index of 5.5g/10 min. The ethylene ethyl acrylate copolymer (EEA) used was made by Union Carbide as Bakelite® flexible ethylene copolymer DPD-6169 which is described as having a melt index of 6g/min. and an ethyl acrylate content of 18 weight percent. Irganox® 1010 which is tetrakis [methylene 3-(3,5 di-tertiary butyl 4 hydroxyphenyl) proprionate]methane made by Ciba-Geigy, was used as an antixoidant. A processing aid S-160 which is butyl benzyl phthalate made by Monsanto Corporation was used to prevent powder/pellet separation prior to extrusion.

In each of the Examples and comparatives a dimer acid was used which was 100% sodium neutralized with sodium cation. The dimer acid was sold by Emery Corp. as Empol® 1024. The dimer salt was used as a preblend (PB) which contained 0.6% dimer acid salt, 0.6% EEA, 2.8% EAA, and 0.1% S-160.

The compositions in Examples 1-12 were made by melt extruding using a 2 ½" Egan single screw extruder having a 40 L/D ratio. The temperatures in Zones 1-7 were 500° F./540° F./530° F./525° F./525° F./525° F./525° F. with the die at 540° F. Glass was fed into Zone 2 and a vacuum of 10" was applied to Zone 3.

Differential Scanning Calorimeter (DSC) values were measured in accordance with the above-described procedure. Between a 5 and 10 milligram sample is prepared. The sample is made in the form of a film which is vacuum dried. The sample is placed in the DSC and heated at 10° C./min. to 280° C. where it is held for 2 minutes. The sample is cooled at 10° C. per minuted. The $T_{cc}$ appears as the peak in the cooling branch of the curve.

$T_{ch}$ is measured using similar sample preparation. The PET sample is melted and then quenched to assure that the sample is substantially amorphous. The sample is heated at 10° C. per minute and a crystallization curve forms when crystallization takes place. The $T_{ch}$ is the temperature at the peak of the curve.

The volatility was measured as time in minutes of heating the indicated temperature to lose 50% of the plasticizer. Mold surface ratings are based on visual appearance ratings of 1 to 10 with 1 being the best and 10 being the worst.

The following ASTM test procedures were used to measure physical properties: Tensile Strength - ASTM D638; Flexural Strength and Modulus - ASTM D790; and Notched Izod Impact Testing - ASTM D256.

Tables 1-3 summarize compositions made using various plasticizers and varying amounts of the plasticizers of the present invention. There was no plasticizer used in Comparative 1. In Comparative 2, the plasticizer was neopentyl glycol dibenzoate. In Comparatives 3 and 6, the plasticizer used was N-alkyl-o,p-toluene-sulfonamide sold by Monsanto Coporation. In Comparatives 4 and 7, the plasticizer used was polyethylene glycol di-2-ethylhexoate sold by C. P. Hall as Tegmer 809. It had a molecular weight of approximately 652. The molecular weight of the other comparative plasticizers are indicated. The plasticizer of Comparative 5 is a triester having a molecular weight of 644. The plasticizer $P_1$ was Formula (1) above and the plasticizer. $P_2$ was Formula (2) above. Both of these were made by the C. P. Hall Corporation.

TABLE I

| | Comp 1 | Comp 2 | Comp 3 | Comp 4 | Comp 5 | Comp 6 | Comp 7 | Ex. 1 | Ex. 2 | Ex. 3 | Ex. 4 | Ex. 5 |
|---|---|---|---|---|---|---|---|---|---|---|---|---|
| PET | 64.75 | 61.15 | 61.15 | 61.15 | 61.15 | 59.25 | 59.25 | 61.15 | 61.15 | 62.00 | 59.25 | 59.25 |
| Fiberglass | 30.00 | 30.00 | 30.00 | 30.00 | 30.00 | 30.00 | 30.00 | 30.00 | 30.00 | 30.00 | 30.00 | 30.00 |
| PB | 4.10 | 4.10 | 4.10 | 4.10 | 4.10 | 4.10 | 4.10 | 4.10 | 4.10 | 4.10 | 4.10 | 4.10 |
| Epoxy | 1.00 | 1.00 | 1.00 | 1.00 | 1.00 | 1.0 | 1.0 | 1.0 | 1.0 | 1.0 | 1.0 | 1.0 |
| Antioxidant | .15 | .15 | .15 | .15 | .15 | 0.15 | 0.15 | 0.15 | 0.15 | 0.15 | 0.15 | 0.15 |
| Plasticizer (%) | — | 3.6 | 3.6 | 3.6 | 3.6 | 5.5 | 5.5 | 3.6 | 3.6 | 2.75 | 5.5 | 5.5 |
| Plasticizer (type) | — | neopentyl glycol dibenzoate | sulfonamide | PE glycol diester | PE glycol triester | sulfonamide | PE glycol ester | $P_1$ | $P_2$ | $P_2$ | $P_2$ | $P_1$ |
| Plasticizer MW | — | 312 | 428 | 652 | 644 | 428 | 652 | 1,394 | 998 | 998 | 998 | 1,394 |
| Volatility @ 270° C. (min to lose 50% of | — | .22 | 3 | 7 | — | — | — | 66 | 36 | — | — | — |

TABLE I-continued

|  | Comp 1 | Comp 2 | Comp 3 | Comp 4 | Comp 5 | Comp 6 | Comp 7 | Ex. 1 | Ex. 2 | Ex. 3 | Ex. 4 | Ex. 5 |
| --- | --- | --- | --- | --- | --- | --- | --- | --- | --- | --- | --- | --- |
| plasticizer) | | | | | | | | | | | | |
| $T_{ch}$ (°C.) | 117 | 105 | 104 | 100 | — | 99 | 94 | 104 | 105 | — | 103 | 105 |
| Molded Surface @ 225° F. | 10 (Sticking) | 3.5 | 2.5 | 1 | 8 | 1.5 | 1 | 2 | 2 | 2½–3 | 1.5 | 1.5 |
| @ 215° F. | — | — | — | — | — | 2 | 1 | — | — | — | 2 | 2 |
| Flex. Str. (psi) (MPa) | 34,000 (235) | 33,000 (230) | 31,000 (215) | 28,500 (200) | — | 30,000 (207) | 27,800 (192) | 30,500 (210) | 30,000 (207) | 29,800 (206) | 27,600 (190) | 26,500 (183) |
| Mod × 10⁶ (psi) (MPa) | 1.30 (8,970) | 1.29 (8,900) | 1.26 (8700) | 1.11 (7660) | — | 1.25 (8,630) | 1.13 (7,800) | 1.17 (8,070) | 1.17 (8,070) | 1.18 (8,141) | 1.15 (7,940) | 1.08 (7,450) |
| Tensil Str. (psi) (MPa) | 22,000 (152) | 21,000 (145) | 20,000 (138) | 18,500 (128) | — | 20,000 (138) | 18,100 (125) | 19,300 (133) | 19,500 (133) | 19,700 (136) | 17,200 (119) | 17,200 (119) |
| Notched Izod ft-lbs/in (J/m) | 1.8 (96) | 1.79 (96) | 1.65 (88) | 1.60 (85) | — | 1.7 (90.7) | 1.72 (91.8) | 1.80 (96) | 1.70 (91) | 1.80 (96) | 1.72 (92) | 1.75 (93.3) |

TABLE II

|  | Ex. 6 | Ex. 7 |
| --- | --- | --- |
| PET | 61.15 | 61.15 |
| Fiberglass | 30.00 | 30.00 |
| Epoxy | 1.00 | 1.00 |
| PB | 4.10 | 4.10 |
| Antioxidant | .15 | .15 |
| $P_1$ | 3.6 | — |
| $P_2$ | — | 3.6 |
| Plasticizer MW | 1,394 | 998 |
| Molding Surface @ 225° F. | 2 | 2 |
| Flex. Str. (psi) (MPa) | 30,400 (210) | 29,100 (208) |
| Flex. Mod. × 10⁶ (psi) (MPa) | 1.17 (8,070) | 1.16 (8,004) |
| Notched Izod ft-lbs/in. (J/m) | 1.80 (96) | 1.81 (96) |

TABLE III

|  | Comp 8 | Comp 9 | Ex. 8 | Ex. 9 | Ex. 10 | Ex. 11 |
| --- | --- | --- | --- | --- | --- | --- |
| PET | 61.15 | 59.25 | 61.15 | 59.25 | 61.15 | 59.25 |
| Fiberglass | 30.00 | 30.00 | 30.00 | 30.00 | 30.00 | 30.00 |
| Epoxy | 1.00 | 1.00 | 1.00 | 1.00 | 1.00 | 1.00 |
| MB | 4.1 | 4.1 | 4.1 | 4.1 | 4.1 | 4.1 |
| Antioxidant | .15 | .15 | 0.15 | 0.15 | 0.15 | 0.15 |
| PE Glycol diester | 3.6 | 5.5 | — | — | — | — |
| $P_1$ | — | — | 3.6 | 5.5 | — | — |
| $P_2$ | — | — | — | — | 3.6 | 5.5 |
| Plasticizer MW | 652 | 652 | 1,394 | 1,394 | 998 | 998 |
| Molding Surface @ 225° F. | 1 | 1 | 1½ | 1½ | 1½ | 1½ |
| Flex. Str. (psi) (MP$_a$) | 28,300 (195) | 27,800 (192) | 30,100 (208) | 26,500 (183) | 30,200 (208) | 27,600 (190) |
| Flex. Mod. (psi) (MP$_a$) | 1.11 (7660) | 1.13 (7800) | 1.17 (8070) | 1.08 (7456) | 1.17 (8070) | 1.15 (7940) |
| Ten. Str. (psi) (MP$_a$) | 18,400 (127) | 18,100 (125) | 19,300 (133) | 17,200 (119) | 19,500 (134) | 17,200 (119) |
| Notched Izod ft-lb/in. notch (J/m) | 1.60 (85) | 1.72 (92) | 1.79 (96) | 1.72 (92) | 1.64 (88) | 1.75 (93) |

The above evaluation of various example compositions and comparative compositions indicate that the plasticizer of the present invention is a significantly less volatile plasticizer, including the esters of difunctional polyethylene oxides such as the one used in Comparatives 4 and 7. The plasticizer of the present invention had satisfactory molded surface appearance and was easily moldable. As shown by Comparative 5 which is a trifunctional having a similar molecular weight as Comparative 4, molded surface appearance was poor. However, by increasing the molecular weight, as shown by Examples 1 and 2, molded surface appearance improved significantly, while at the same time improving resistance to volatility more than five times for Example 2 and more than nine times in Example 1. Physical properties remain substantially the same as in the Comparative cases.

While exemplary embodiments of the invention have been described, the true scope of the invention is to be determined from the following claims.

What is claimed is:

1. A composition comprising:
   a linear saturated polyester; and from 0.5 to 30% by weight of the polyester of at least one ester of an alcohol and a carboxylic acid wherein the alcohol has the formula:

$R^1[(OR^2)_nOH]_m$ wherein $R^1$ is a hydrocarbon radical of from 3 to 10 carbon atoms, $R^2$ is a hydrocarbon radical of from 2 to 4 carbon atoms, n can be the same or different integer of from 2 to 15, m is an integer of from 3 to 6, the alcohol has greater than 20 carbon atoms; and
   wherein the acid is a carboxylic acid of from 1 to 25 carbon atoms, and the molecular weight of the ester is from 900 to 1,500.

2. The composition as recited in claim 1 wherein the carboxylic acid with from 3 to 10 carbon atoms and rom 1 to 3 carboxyl groups.

3. The composition as recited in claim 1 wherein the carboxylic acid is an aliphatic carboxylic acid with from 3 to 10 carbon atoms and one carboxyl group.

4. The composition as recited in claim 1 wherein the alcohol has the formula:

$$\begin{array}{l} CH_2-(OCH_2CH_2)_nOH \\ | \\ CH-(OCH_2CH_2)_nOH \\ | \\ CH_2-(OCH_2CH_2)_nOH \end{array}$$

wherein n is from 3 to 15.

5. The composition as recited in claim 1 wherein there is from 1 to 10 percent by weight of the polyester of the ester.

6. The composition as recited in claim 1 wherein the polyester comprises polyethylene terephthalate.

7. The composition as recited in claim 6 further comprises a nucleating agent.

8. The composition as recited in claim 7 wherein the nucleating agent is at least one compound containing a sodium cation or potassium cation.

9. The composition as recited in claim 8 wherein the nucleating agent is the sodium salt of a carboxylic acid.

10. The composition as recited in claim 8 wherein the nucleating agent is the sodium salt of a hydrocarbon carboxylic acid containing material.

11. The composition as recited in claim 7 further comprising up to 150 percent based on the weight of the polyester of a filler or reinforcing material.

12. The composition as recited in claim 11 wherein there is from about 30 to 90 percent based on the weight of the polyester of fiberglass filler.

13. The composition as recited in claim 7 containing sufficient amounts of the ester and nucleating agents to have a $T_{ch}$ of not greater than 110° C. and a $T_{cc}$ of at least about 205° C.

14. The composition as recited in claim 7 further comprising up to 20 percent of an impact modifier.

15. The composition as recited in claim 14 wherein the impacet modifier is a polymer material comprising an alfa-olefin homopolymer or copolymer and a carboxylic acid moiety or derivative thereof.

16. The composition as recited in claim 15 wherein the impact modifier is a copolymer of ethylene and at least one monomer selected from the group consisting of acrylic acid, ethyl acrylate, methacrylic acid, methyl methacrylate, and the metal salts acrylic acid, and methacrylic acid.

17. The composition as recited in claim 7 further comprising up to 3 percent of an epoxy compound.

18. An article molded from the composition as recited in claim 1.

* * * * *